(12) United States Patent
Moody et al.

(10) Patent No.: US 9,368,311 B2
(45) Date of Patent: Jun. 14, 2016

(54) PHOTOCATHODE DEVICE THAT REPLENISHES PHOTOEMISSIVE COATING

(71) Applicant: Los Alamos National Security, LLC, Los Alamos, NM (US)

(72) Inventors: Nathan A. Moody, Los Alamos, NM (US); David C. Lizon, Rio Rancho, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 14/870,072

(22) Filed: Sep. 30, 2015

(65) Prior Publication Data
US 2016/0093460 A1 Mar. 31, 2016

Related U.S. Application Data

(60) Provisional application No. 62/057,466, filed on Sep. 30, 2014.

(51) Int. Cl.
*H01J 40/06* (2006.01)
*H01J 1/34* (2006.01)

(52) U.S. Cl.
CPC ........................................ *H01J 1/34* (2013.01)

(58) Field of Classification Search
CPC .......................................................... H01J 1/34
USPC ............................................. 313/542, 544, 11
See application file for complete search history.

(56) References Cited

U.S. PATENT DOCUMENTS

2004/0065547 A1* 4/2004 Stevens et al. ....... G05D 11/138
204/405

* cited by examiner

*Primary Examiner* — Vip Patel
(74) *Attorney, Agent, or Firm* — LeonardPatel PC (57) ABSTRACT

A photocathode device may replenish its photoemissive coating to replace coating material that desorbs/evaporates during photoemission. A linear actuator system may regulate the release of a replenishment material vapor, such as an alkali metal, from a chamber inside the photocathode device to a porous cathode substrate. The replenishment material deposits on the inner surface of a porous membrane and effuses through the membrane to the outer surface, where it replenishes the photoemissive coating. The rate of replenishment of the photoemissive coating may be adjusted using the linear actuator system to regulate performance of the photocathode device during photoemission. Alternatively, the linear actuator system may adjust a plasma discharge gap between a cartridge containing replenishment material and a metal grid. A potential is applied between the cartridge and the grid, resulting in ejection of metal ions from the cartridge that similarly replenish the photoemissive coating.

20 Claims, 5 Drawing Sheets

FIG. 2C

PHOTOCATHODE DEVICE THAT REPLENISHES PHOTOEMISSIVE COATING

CROSS REFERENCE TO RELATED APPLICATIONS

This application claims the benefit of U.S. Provisional Patent Application No. 62/057,466 filed on Sep. 30, 2014. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to photocathode devices, and more particularly, to photocathode devices that can replenish a photoemissive coating that is depleted during photoemission.

BACKGROUND

A photocathode device is a vacuum electronics device that emits a beam of electrons when photons from a suitable light source (e.g., lasers, high intensity Light Emitting Diodes (LEDs), etc.) impinge on its photoemissive coating in a vacuum environment with a photon energy that exceeds the work function of the photocathode device. Photocathode devices can produce high peak and high average current densities while also allowing a precise gating of the photoemission of the electron beam. A photocathode device is often characterized by its Quantum Efficiency (QE), which is the ratio of the number of photons incident on the photoemissive coating to the number of emitted electrons. QE values for photocathode devices used with a Radio Frequency (RF) accelerator, for example, are typically about 2-10%.

A problem that that limits the utility of photocathode devices for continuous operation relates to evaporation and/or desorption of the photoemissive coating during photoemission. This degradation problem limits the potential use of photocathode devices as electron sources for medical x-ray devices, for high power devices (e.g., free electron lasers), and for other devices in which continuous operation over a period of at least a few weeks versus a few hours is desirable. Accordingly, an improved photocathode device may be beneficial to metrics of a given application, such as reduced cost, reduced system complexity, and/or improved performance.

SUMMARY

Certain embodiments of the present invention may provide solutions to the problems and needs in the art that have not yet been fully identified, appreciated, or solved by current photocathode devices. For example, some embodiments of the present invention pertain to a photocathode device that is configured to replenish its photoemissive coating that is lost during photoemission without reliance on heating of the actual photocathode, which has been shown to induce degradation.

In an embodiment, an apparatus includes a first chamber including a porous cathode substrate. The porous cathode substrate includes an outer wall surface and an inner wall surface. The apparatus also includes a second chamber housing a replenishment material. The second chamber is separated from the first chamber by a first wall. The first wall includes an orifice that allows a vapor of the replenishment material to move into the first chamber from the second chamber. The apparatus further includes a linear actuator system configured to convert the replenishment material into vapor or ions. At least some of the replenishment material vapor or ions travel through the inner wall surface of the porous cathode substrate to the outer wall surface of the porous cathode substrate (a process known as "diffusion"), replenishing a photoemissive coating. In certain embodiments, the thickness and porosity of the cathode substrate may be modified to meet the needs of a given application (e.g., the diffusion rate may be lowered by reducing substrate porosity).

In another embodiment, a photocathode device includes a first chamber including a porous cathode substrate. The porous cathode substrate includes an outer wall surface and an inner wall surface. The photocathode device also includes a photoemissive coating on the outer wall surface of the porous cathode substrate and a second chamber including a replenishment material. The second chamber is separated from the first chamber by a first wall. The first wall includes an orifice that allows a vapor of the replenishment material to move into the first chamber from the second chamber. The photocathode device further includes a linear actuator system configured to convert the replenishment material into vapor. The linear actuator system includes a rod and a compressive element configured to urge the rod into a position where a tip of the rod is forced into the orifice. The linear actuator system also includes a first piezo-electrode and a second piezo-electrode configured to create a voltage potential therebetween. The linear actuator system further includes a piezo linear motor configured to oscillate the rod back and forth when the voltage potential is created between the first piezo-electrode and the second piezo-electrode. At least some of the replenishment material vapor travels (i.e., diffuses) through the inner wall surface of the porous cathode substrate to the outer wall surface of the porous cathode substrate, replenishing the photoemissive coating.

In yet another embodiment, a photocathode device includes a first chamber including a porous cathode substrate. The porous cathode substrate includes an outer wall surface and an inner wall surface. The photocathode device also includes a photoemissive coating on the outer wall surface of the porous cathode substrate and a second chamber. The second chamber is separated from the first chamber by a first wall. The first wall includes an orifice that allows ions of the replenishment material to move into the first chamber from the second chamber. The photocathode device further includes a linear actuator system configured to convert the replenishment material into ions. The linear actuator system includes a rod including a cartridge at an end thereof. The cartridge includes the replenishment material and is inserted into the second chamber such that the second chamber comprises the replenishment material. The linear actuator system also includes a metallic grid spanning the orifice. The metallic grid provides a difference in electric potential with respect to the rod such that ions are generated from the replenishment material in the cartridge of the rod. At least some of the replenishment material ions travel through the inner wall surface of the porous cathode substrate to the outer wall surface of the porous cathode substrate, replenishing the photoemissive coating.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a photocathode device that can replenish its photoemissive coating lost during photoemission. The photocathode device may have a porous cathode substrate and a photoemissive coating covering the outer surface thereof. The photocathode device may have a substantially cylindrical shape with an axis, and material for replenishing the photoemissive coating may be contained within.

The photoemissive coating may be any suitable coating. In practice, alkali metals and compounds have been found to be good performers, with elemental cesium or an alloy or compound that includes cesium being the highest performer of these alkali metals. However, any suitable element or compound that achieves sufficient photoemission may be used without deviating from the scope of the invention.

Replenishment occurs when the replenishment material (e.g., an alkali metal such as cesium) contacts the inner surface of the porous cathode substrate and effuses through the porous cathode substrate to the outer surface thereof. In some embodiments, the photocathode device includes two internal walls, an end wall, and three chambers. The two internal walls and porous cathode substrate may be substantially parallel to one another. In some embodiments, the first of the three chambers is between the porous cathode substrate and a first inner wall, the second of the three chambers is between the first inner wall and a movable second wall, and the third chamber is between the movable second wall and the end wall.

A spring may be located inside the third chamber. An orifice may be located at the center of the first inner wall along the axis of the device. Replenishment material vapor that is generated inside the second chamber may enter the first chamber through the orifice.

Some embodiments include a rod collinear with the axis. The rod has a predetermined length, a front tip, and a back end. The rod may pass through the centers of the second movable wall and the spring. The rod may also have a shoulder portion that engages the second movable wall. The spring inside the third chamber may compressively engage the shoulder portion and the end wall. The spring may provide a force that urges the tip of the rod into the orifice of the first inner wall.

The photocathode device may also include a linear actuator system that that urges the tip of the rod out of the orifice of the first inner wall. The linear actuator system may include a piezo linear motor having two ends, and a piezo-electrode at each of the two ends. However, other mechanisms for urging the tip of the rod into and out of the orifice may be used without deviating from the scope of the invention.

A first of the piezo-electrodes may contact the end wall and a second of the piezo-electrodes may be at the end opposite the first piezo-electrode. The back end of the rod may be attached to the second piezo-electrode. Thus, the rod extends along the axis of the photocathode device from the second chamber, through the third chamber, and through the piezo linear motor to the second piezo-electrode. When there is no external potential applied between the two piezo-electrodes, the photocathode device is not actuated and the spring provides a force on the rod that pushes the tip of the rod into the orifice such that its default state is the "off" state.

During photoemission, a suitable light source provides light that impinges on the photoemissive surface and a beam of electrons is emitted from the porous cathode substrate through the photoemissive coating. However, over time, the photoemissive coating degrades. The photocathode device allows for replenishment of the photoemissive coating with fresh material. To replenish the coating, the second chamber may contain a reservoir of replenishment material that is converted to vapor.

During photoemission, the photocathode device is in a vacuum environment and a suitable oscillating electrical potential may be applied across the first and second piezo-electrodes. The oscillating potential induces an elongation and contraction of the piezo motor along the axis, which produces a reciprocating (i.e., back-and-forth) micromechanical motion of the second movable wall and the rod along the axis. As the rod moves back and forth, the tip of the rod periodically moves into and out of the orifice. As the second wall moves back and forth, it agitates the replenishment material inside the second chamber.

Agitation of the replenishment material in the vacuum environment promotes evaporation of the replenishment material into vapor. As vapor moves in front of the orifice, the rod pushes it through the orifice and into the first chamber toward the porous cathode substrate. At least some of the vapor deposits on the inner surface of the porous cathode substrate. The deposited replenishment material effuses through the porous cathode substrate to the outer surface, where it replenishes the photoemissive coating.

Actuation by a reciprocating motion of the tip into and out of the orifice may begin by applying a low amplitude, high frequency voltage pulse train to either of the piezo-electrodes. Starting with a low amplitude allows the user to slowly increase amplitude, frequency, and pulse duration in order to replenish the photoemissive coating, which rejuvenates the performance of the photocathode device. This process of replenishment can occur while the photocathode is in use as an electron beam source, or as otherwise determined by the user. This may be repeated when replenishment of the photoemissive coating is desired again.

The rate at which the replenishment material is delivered to the photoemissive surface may be controlled by adjusting the frequency and pulse duration of the piezo actuator. The rate may be set to be substantially equal to the rate that material is used in the user's application. For instance, the user can measure the electron beam continuously or periodically and determine a trend. Degradation in electron beam performance generally calls for an increase in the amount of photoemissive material, whereas performance retuning to the desired beam strength calls for a decrease. As such, the user may determine the rate that the photoemissive coating is used and adjust the replenishment so as to reach equilibrium. The ability to select amplitude, frequency, and pulse duration of the rejuvenation mechanism allows a user to gain fine control over this aspect of photocathode operation.

In some embodiments, a photocathode device that can replenish its photoemissive coating has, like the photocathode device discussed above, a substantially cylindrical shape, an axis, a porous cathode substrate, and a photoemissive coating on the outer surface of the porous cathode substrate. Such embodiments, like that discussed above, also include two inner walls, an end wall, three chambers, and a linear actuator system including a pair of piezo-electrodes with a piezo linear motor between the piezo-electrodes. The inner walls, end wall, porous cathode substrate, and piezo-electrodes are substantially parallel to one another. These embodiments also include an axially disposed rod.

However, unlike the embodiment discussed above, the rod of these embodiments is positioned inside an electrically non-conductive sleeve that keeps the rod from being in direct contact with other parts of the device. The sleeve may include a shoulder portion that engages the second movable wall. A cartridge may be engaged to the front end of the rod. The cartridge may be loaded with replenishment material. A metallic grid may span a central orifice in the first inner wall. The piezo linear motor is located between the two piezo-electrodes. However, unlike above, where an oscillating potential is used during operation to lengthen the piezo linear motor relative to its normal length, here, a non-oscillating potential is used to shorten the length of the piezo linear motor. This brings the cartridge closer to the metallic grid.

When a suitable electrical potential is applied between the metallic grid and the cartridge, ions (e.g., cesium ions) are ejected from the cartridge as a plasma and travel from the cartridge, through the metallic grid, and to the porous cathode substrate. As the cartridge becomes depleted during photoemission, it is brought closer to the grid to maintain a desired rate of ion ejection from the cartridge. The application of a suitable potential actuates the piezo linear motor and adjusts the length of the piezo motor with sufficient precision to maintain a plasma discharge gap spacing between the grid and the cartridge, which maintains the rate of extraction of ions from the cartridge. The rate of extraction can be continuously monitored by measuring the electrical current flowing between the cartridge and the metallic grid.

Ions extracted from the cartridge enter the first chamber and deposit on the inner surface of the porous cathode substrate. There, they accept electrons and are converted from ions to atoms that effuse through the porous substrate from the inner surface of the porous substrate to the outer surface of the porous substrate, where they replenish the photoemissive coating as needed to extend the operating lifetime of the photocathode device and allow continuous operation of the photocathode device until the cartridge is nearly or completely depleted and the photoemissive coating has substantially degraded. At this point or before photoemission stops, the extraction rod with the depleted cartridge may be removed from the sleeve and replaced with a fresh cartridge.

Figure 1A:
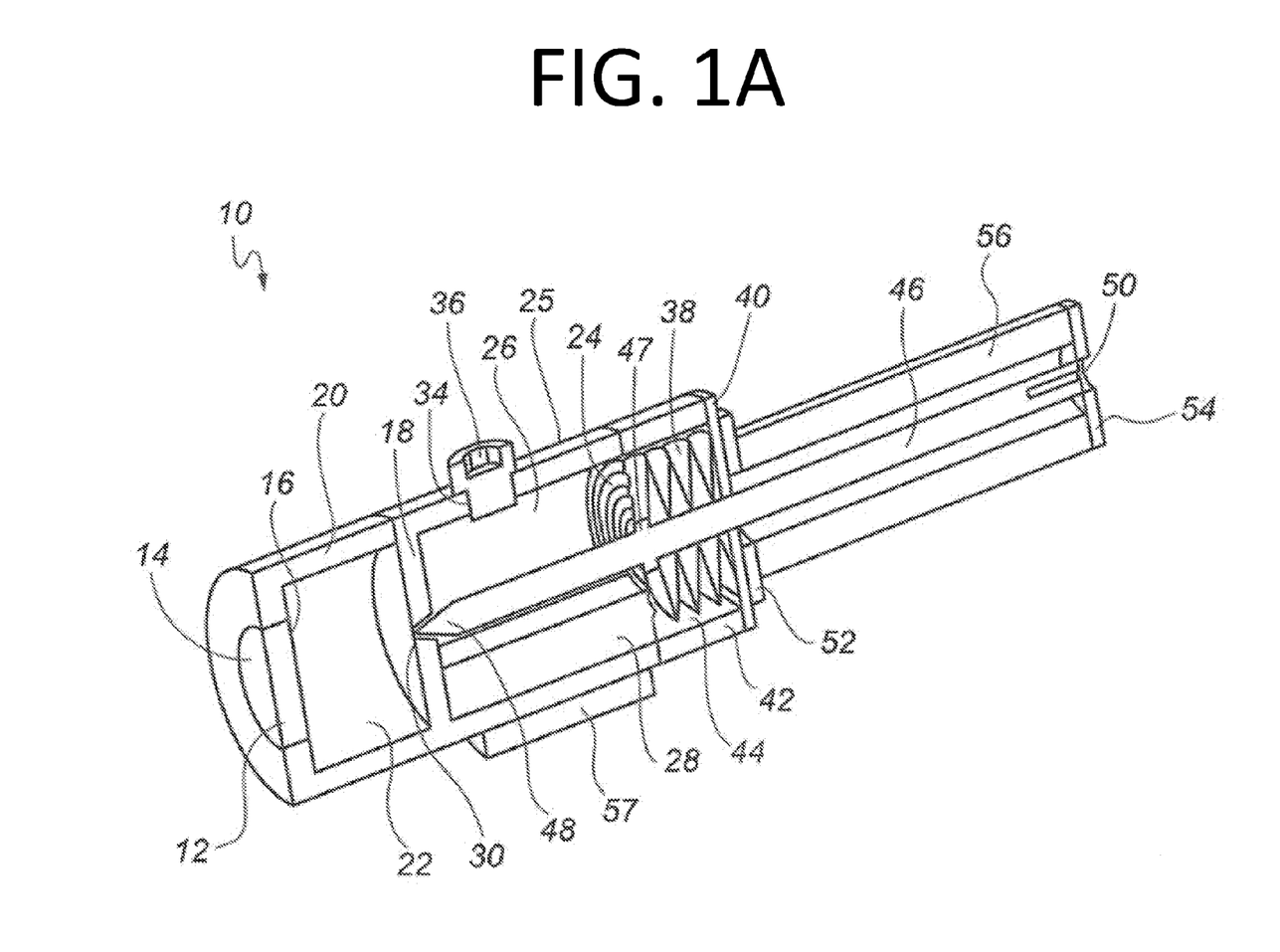
FIG. 1A is a perspective cutaway view illustrating a photocathode device in an "off" replenishment state, according to an embodiment of the present invention.
Figure 1B:
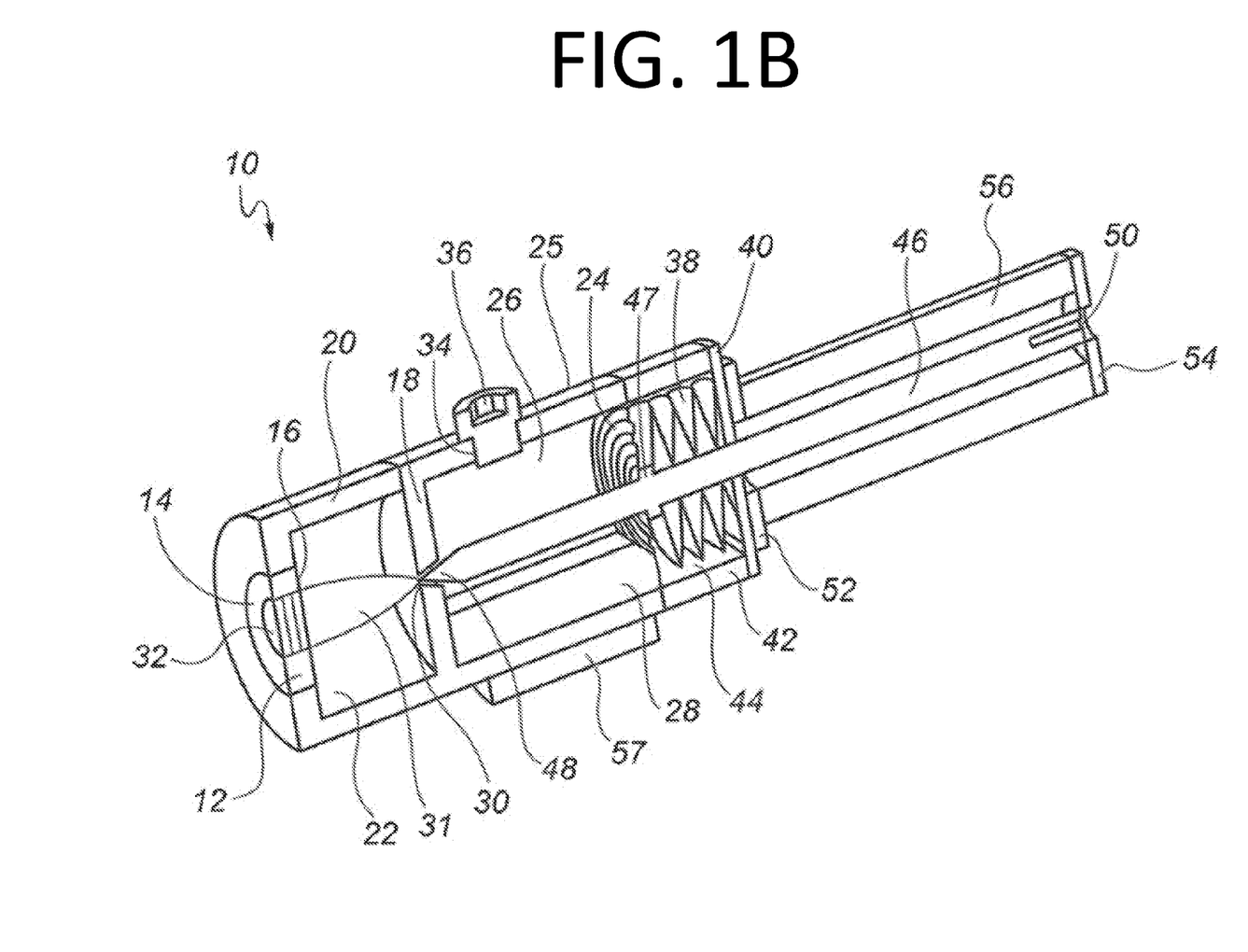
FIG. 1B is a perspective cutaway view illustrating the photocathode device in an "on" replenishment state, according to an embodiment of the present invention.

FIGS. 1A and 1B illustrate a photocathode device 10 in "off" and "on" replenishment states, respectively, according to an embodiment of the present invention. Photocathode device 10 has a substantially cylindrical shape with a porous cathode substrate 12 having an outer wall surface 14 and an inner wall surface 16. Photocathode device 10 also includes a second wall 18 that, in combination with porous cathode substrate 12 and outer cylindrical wall portion 20, defines a first chamber 22. Photocathode device 10 includes a movable wall 24 that, in combination with second wall 18 and outer cylindrical wall portion 25, defines a second chamber 26. A reservoir 28 containing cesium metal, for example, is stored inside second chamber 26. A central orifice 30 in second wall 18 provides fluid communication between first chamber 22 and second chamber 26.

As shown in FIG. 1B, during operation, vapor generated from reservoir 28 may enter first chamber 22 through orifice 30, perhaps in the form of a "spray" 31 that deposits on inner wall surface 16 of porous cathode substrate 12. The deposited vapor effuses through the porous cathode substrate 12 to the outer wall surface 14, where it replenishes photoemissive coating 32 on outer surface 14 of porous cathode substrate 12. Replenishment of photoemissive coating 32 stabilizes photocathode device 10 and permits continuous operation of photocathode device 10 for a long as more material remains in reservoir 28. Additional replenishment material can be added to reservoir 28 through an orifice 34 in cylindrical wall 25 after removing a fill plug 36.

Photocathode device 10 also includes a compressive element 38, such as a spring. Movable wall 24, in combination with end wall 40 and outer cylindrical wall 42, defines a third chamber 44. Compressive element 38 is inside third chamber 44. Compressive element 38 is part of a linear actuator system that regulates the release of replenishment material vapor from second chamber 26 to first chamber 22. Regulating the release of the vapor also regulates the rate of replenishment of photoemissive coating 32.

The linear actuator system includes various elements that cooperate in regulating the rate of replenishment of photoemissive coating 32. Movable wall 24 and compressive element 38 are elements of the linear actuator system. The linear actuator system also includes a rod 46, a shoulder portion 47 separating wall 24 from compressive element 38, a front tip 48, and a back end 50.

During photoemission, an electron beam is emitted from the porous cathode surface through photoemissive coating 32. As time passes while in operation, photoemissive coating 32 degrades. Replenishment of photoemissive coating 32 may begin after applying a suitable electrical potential between first piezo-electrode 52 and second piezo-electrode 54. In between piezo-electrodes 52, 54 is a piezo linear motor 56 that is engaged to back end 50 of rod 46. Piezo linear motor 56 includes a material known as a "piezo crystal," which is material that elongates in response to an electric field. A typical example of a piezo crystal is PZT, or lead zirconate titanate ($Pb[Zr_{(x)}Ti_{(1-x)}]O_3$), one of the most common piezoelectric ceramic materials. PZT has a perovskite crystal structure, where each unit cell consists of a small tetravalent metal ion in a lattice of large divalent metal ions. On the atomic scale, the atoms of this unit cell are preferentially repositioned when a suitable field is applied across the crystal. The atoms return to their original positions when this field is removed. In the case of photocathode device 10, actuation occurs upon application of a suitable potential across piezoelectrodes 52, 54, which provide the electric field that results in elongation of piezo linear motor 56. Second piezo electrode 54, in combination with compressive element 38 and movable wall 24, together assist in maintaining a coaxial alignment of the axis of shaft 46 with the axis of photocathode device 10.

During operation (i.e., during photoemission), if replenishment is desired, a suitable electrical potential is applied between first piezo-electrode 52 and second piezo-electrode 54. This electrical potential results in elongation of piezo linear motor 56, which provides rod 46 with a force in opposition to the force provided by compressive element 38. The net effect of elongation is that shoulder portion 47 moves to the left against compressive element 24, and tip 48 of rod 46 is urged out of orifice 30.

When piezo linear motor element 56 is actuated, it elongates along the axial direction, which provides a force that opposes the restoring force provided by compressive element 38. The net effect of actuation is movement of tip 48 of rod 46 away from orifice 30. Typical actuation of photocathode device 10 involves providing a suitable oscillating potential across piezo-electrodes 52, 54, which would result in an oscillating electric field across the length of piezo linear motor 56. The actuation is oscillatory, and piezo linear motor 56 periodically elongates and contracts, which oscillates shoulder portion 47 back and forth, which, in turn, agitates the replenishment material of reservoir 28, promoting evaporation thereof. In some embodiments, this oscillation may occur between 200 and 1,000 times per second (i.e., between 0.2 and 1 KHz). The oscillation of rod 46 provides the pressure to move vapor through the orifice.

Photocathode device 10 may optionally include a heating element 57 to aid in evaporation of the replenishment material in reservoir 28. This is mild heating, which may not be far beyond room temperature, is optional and beneficial when a user prefers fine control of diffusion. Front tip 48 of rod 46 pushes the replenishment material vapor, perhaps in the form of spray 31, into first chamber 22. The vapor confined by walls of chamber 22 and coats the walls. Vapor atoms will either stick or bounce, but some will stick and a coating forms. The vapor deposits onto inner surface 16 of porous cathode substrate 12 and effuses through wall 12 to outer surface 14, where it replenishes photoemissive coating 32.

Figure 2A:
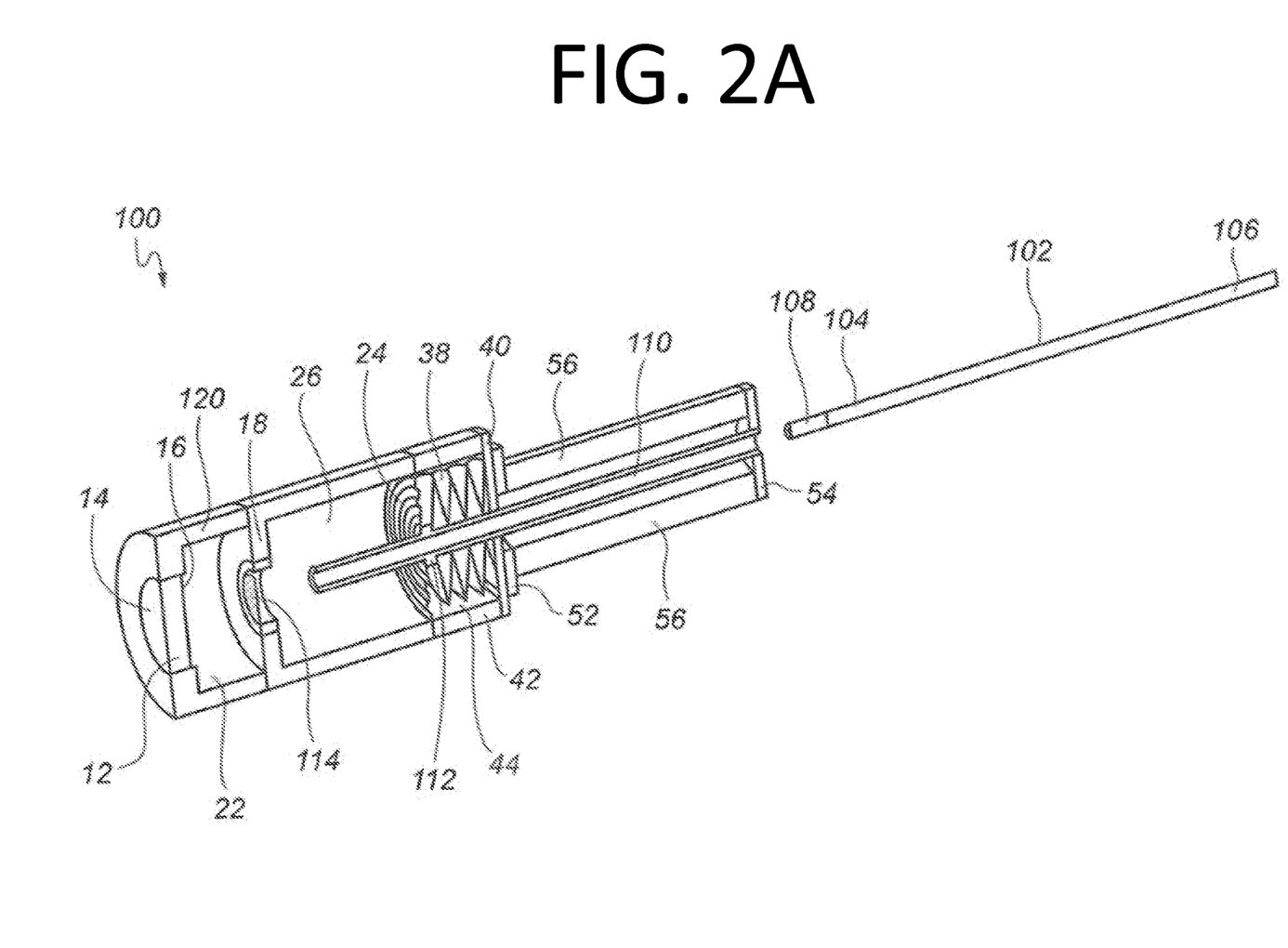
FIG. 2A is a perspective cutaway view illustrating another photocathode device with an extraction rod removed, according to an embodiment of the present invention.
Figure 2B:
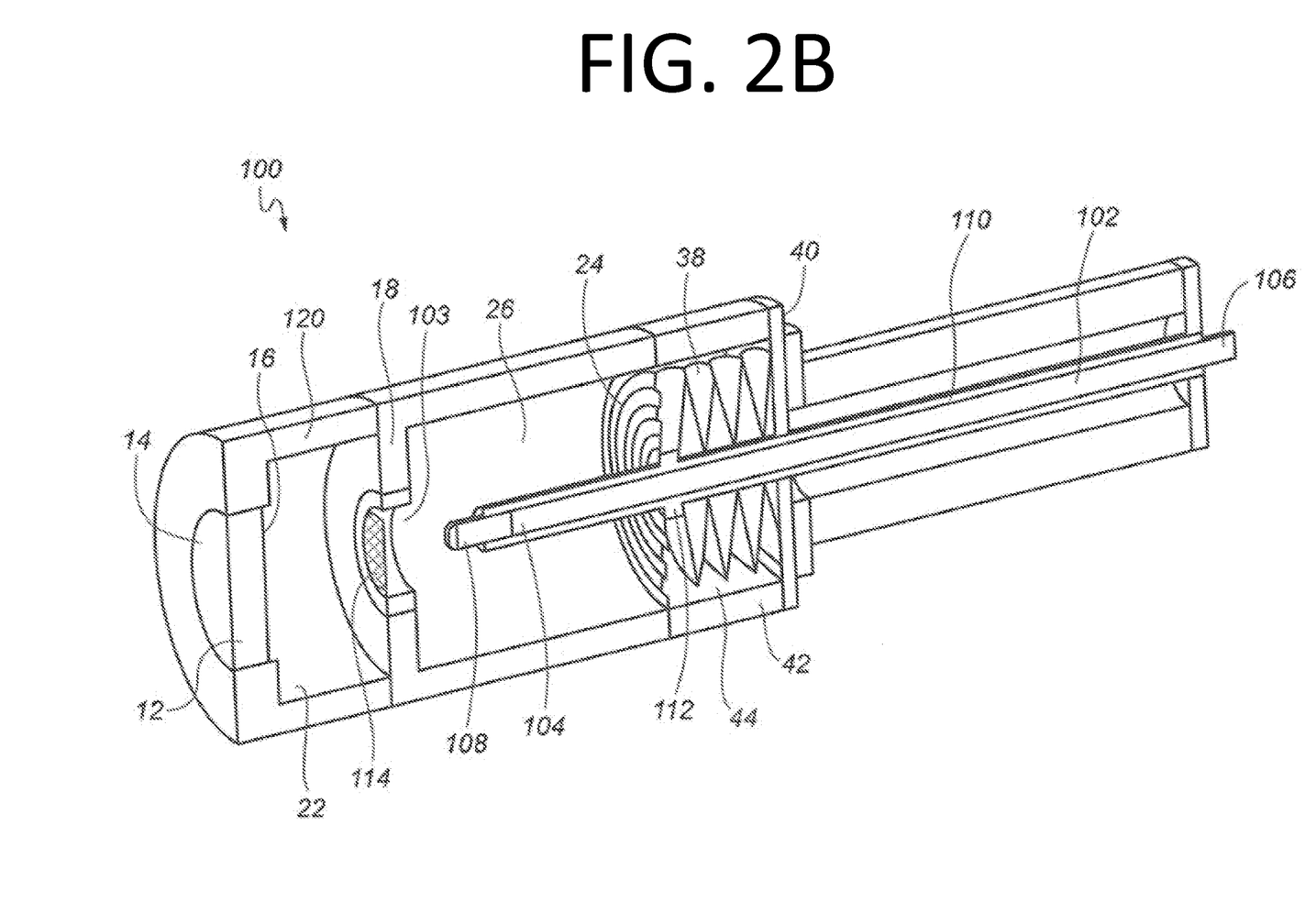
FIG. 2B is a perspective cutaway view illustrating the photocathode device in an "off" replenishment state, according to an embodiment of the present invention.
Figure 2C:
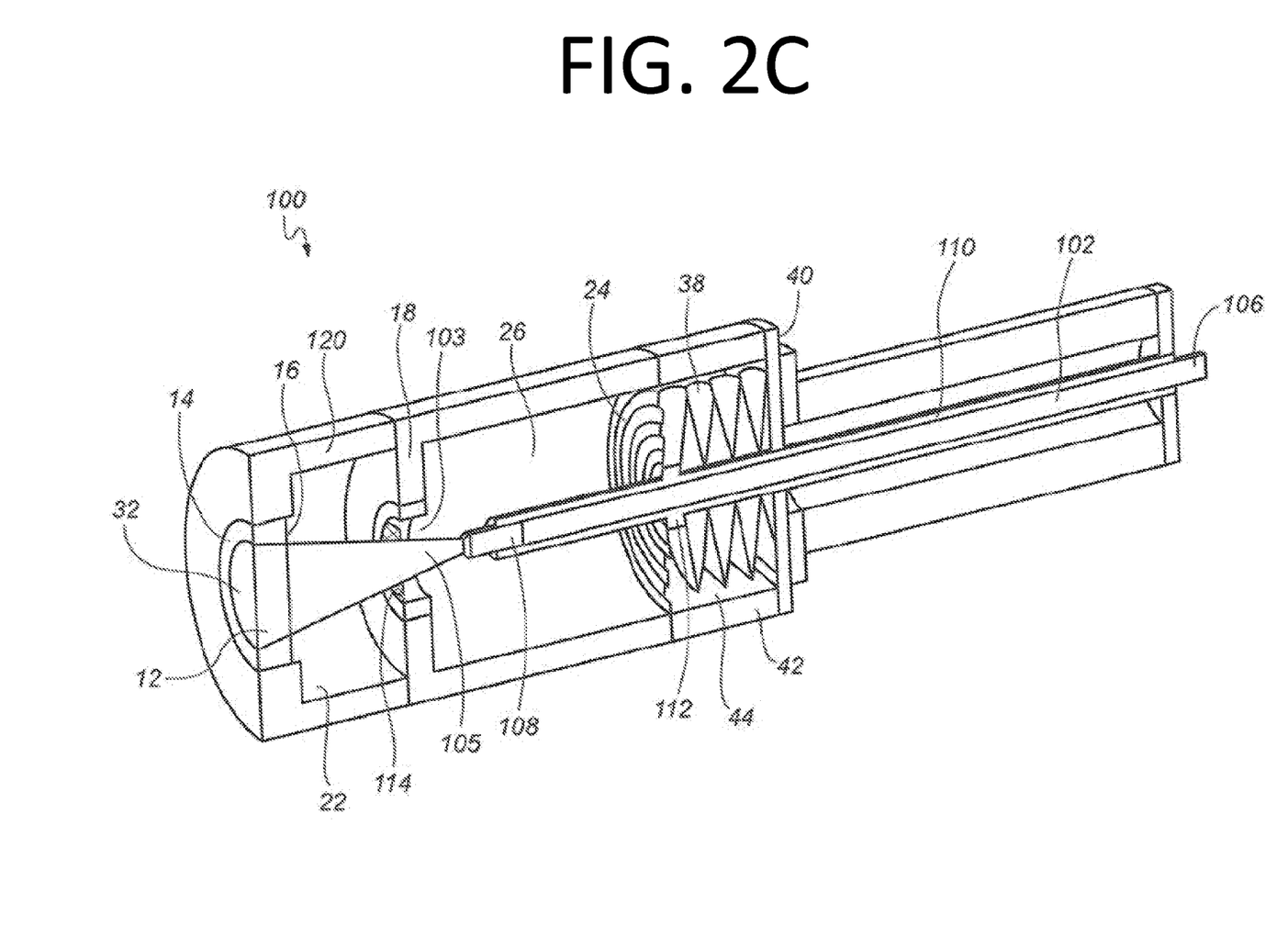
FIG. 2C is a perspective cutaway view illustrating the photocathode device in an "on" replenishment state, according to an embodiment of the present invention.

FIGS. 2A-C illustrate another photocathode device 100, according to an embodiment of the present invention. More specifically, FIG. 2A shows photocathode device 100 prior to insertion of a rod 102 with an attached replenishment material cartridge 108, FIG. 2B shows assembled photocathode device 100 in an "off" replenishment state, and FIG. 2C shows assembled photocathode device 100 in an "on" replenishment state. As is apparent from FIGS. 2A-C, there are various structural similarities between photocathode device 10 and photocathode device 100. For instance, photocathode device 100 also has a substantially cylindrical shape and a porous cathode substrate 12 having an outer wall surface 14 and an inner wall surface 16. Photocathode device 100 also includes a second wall 18 that, in combination with porous cathode substrate 12 and outer cylindrical wall 120, defines a first chamber 22. Like photocathode device 10, photocathode device 100 includes a movable wall 24 that, in combination with second wall 18 and outer cylindrical wall 20, defines a second chamber 26. Photocathode device 100 also includes a central orifice 103 in second wall 18 that provides fluid communication between first chamber 22 and second chamber 26.

However, unlike the vapor that is generated in photocathode device 10, replenishment material ions 105 (e.g., sodium, potassium, cesium, etc.) are generated inside second chamber 26. Certain replenishment materials, such as sodium, potassium, and the like, are better delivered via an ionization mechanism than via a piezoelectric pump. As such, photocathode device 100 may be better suited to use these materials than photocathode device 10.

Replenishment material ions 105 enter first chamber 22 through orifice 103 and deposit on inner wall surface 16 of porous cathode substrate 12. The deposited ions pick up negative charges that convert the ions into atoms that effuse through porous cathode substrate 12 to outer wall surface 14, where they replenish photoemissive coating 32 on outer wall surface 14 during operation (i.e., photoemission). Replenishment of photoemissive coating 32 stabilizes photocathode device 100 and permits continuous operation of photocathode device 100 so long as replenishment material 108 remains.

Photocathode device 100 includes a movable wall 24 that, in combination with end wall 40 and outer cylindrical wall 42, defines a third chamber 44. Photocathode device 100 also includes a compressive element 38 (e.g., a spring) inside third chamber 44. Compressive element 38 is part of a linear actuator system that stabilizes the rate of generation of ions 105 and the rate of replenishment of photoemissive coating 32. The linear actuator system includes various elements that cooperate in regulating the rate of replenishment of photoemissive coating 32, including movable wall 24, compressive element 38, and a rod 102, which has a front end 104 and a back end 106. A replenishment material cartridge 108 is attached to, and in electrical contact with, front end 104 of rod 102. An insulating sleeve 110 surrounds all but the tip of rod 102 and cartridge 108. A portion of cartridge 108 and rod 102 extend out of insulating sleeve 110, which insulates rod 102 and cartridge 108 from direct contact with electrically conducting parts of photocathode device 100. Insulating sleeve 110 includes a shoulder portion 112 configured to engage movable wall 24 and compressive element 38. Thus, as insulating sleeve 110 moves, so do rod 102, cartridge 108, compressive element 38, and movable wall 24.

The linear actuator system of photocathode device 100 also includes a first piezo-electrode 52 and a second piezo-electrode 54. Between the piezo-electrodes is a piezo linear motor 56 that is engaged to insulating sleeve 110. Piezo linear motor 56 includes a piezo crystal. For photocathode device 100, the piezo crystal shortens in response to a suitable potential applied between the piezo electrodes. The atoms of the piezo crystal are repositioned when the suitable field is applied across the crystal. The atoms return to their original positions when this field is removed.

In the case of photocathode device 100, actuation occurs upon application of a suitable potential across piezo-electrodes 52 and 54, which provide the electric field that results in shortening the length of piezo linear motor 56. Second piezo electrode 54, in combination with compressive element 38 and movable wall 24, together assist in maintaining a coaxial alignment of the axis of rod 102 with the axis of photocathode device 100.

Insulating sleeve 110 seals against second piezo-electrode 54. Thus, as sleeve 110 moves, so does second piezo-electrode 54. First piezo-electrode 52, however, remains stationary because it is attached to a stationary wall.

During replenishment, ions 105 are emitted from cartridge 108. In time, cartridge 108 becomes depleted of replenishment material, but may be replaced relatively easily with a fresh cartridge by removing rod 102, along with what's left of its attached cartridge 108, from sleeve 110 and replacing rod 102 with another rod having an attached fresh cartridge.

Both rod 102 and cartridge 108 are conducting, and when a suitable voltage source is electrically connected to end 106 of rod 102 that is opposite from cartridge 108, a potential may be applied to create a gradient between cartridge 108 and metallic grid 114 during operation for plasma extraction of ions 105 from cartridge 108. Ions 105 that are extracted from cartridge 108 are accelerated toward metallic grid 114. Most of ions 105 pass through metallic grid 114 (e.g., an electroformed mesh screen consisting of nickel or refractory metal) and continue onward toward inner surface 16 of porous cathode substrate 12.

As ions 105 are extracted from cartridge 108, cartridge 108 becomes depleted. As cartridge 108 releases replenishment material in the form of ions 105, the distance between cartridge 108 and metallic grid 114 slowly changes. Changes in this distance also change the potential gradient between the replenishment material in cartridge 108 and metallic grid 114, which changes the rate at which ions 105 are extracted from cartridge 108. However, maintaining a certain rate of ion extraction from cartridge 108 is desirable.

In order to maintain a rate of extraction of ions 105 from cartridge 108, the distance between cartridge 108 and metallic grid 114 may be adjusted using the linear actuator system. This distance may be adjusted by applying a suitable electrical potential between first piezo-electrode 52 and second piezo-electrode 54. A difference between photocathode 10 and photocathode 100 in some embodiments is that in the former, an Alternating Current (AC) voltage is applied, whereas in the latter, a Direct Current (DC) voltage is applied. The application of this potential actuates piezo motor 56, shortening the length of piezo motor 56, which maintains the distance between the exposed surface of cartridge 108 and metallic grid 114. This maintains the plasma discharge gap between metallic grid 114 and cartridge 108, which maintains the rate at which ions 105 are extracted from cartridge 108. Thus, the potential gradient between cartridge 108 and metallic grid 114 is maintained during plasma extraction. Ions that enter first chamber 22 contact porous cathode substrate 12, where they accept electrons and become atoms without a net electric charge. The atoms effuse through porous substrate 12 from inner surface 16 to outer surface 14, where they replenish photoemissive coating 32 during operation.

Embodiments may be used for various applications, such as those where it is desirable for the photocathode device to operate for long periods of time. For instance, some embodiments may be used for satellites and other space vehicles, compact accelerators, particle accelerators, and medical systems, among others. Some embodiments are also particularly beneficial in applications where power is constrained and/or there is not a large customer base, as well as where budget is an issue.

The specific procedure for utilizing photocathode devices 10, 100 described above in a given application will depend upon the requirements and constraints associated with that application. However, there are certain steps common to applied use of the photocathode devices 10, 100 that entail preparation, usage, maintenance, and refurbishment. Photocathode devices should generally be cleaned before they are used. An example cleaning technique is cleaning with an ultrasonic bath followed by bake-out.

In the case of photocathode device 10, after cleaning, plug 36 is removed and replenishment material is loaded into photocathode device 10 under an inert gas atmosphere (e.g., argon). This can be performed in an argon-filled glovebox, for example. After loading replenishment material into photocathode device 10, it is ready to be placed into service in a vacuum environment. Photocathode device 10 may be transported from the glove box to a vacuum environment using a load-lock suitcase or another suitable technique. Photoemissive coating 32 may be deposited onto outer surface 14 of porous cathode substrate 12 by chemical vapor deposition while in a load-lock system. Photocathode device 10 is then ready for installation in a host vacuum environment where it can function as an electron beam source. Degradation in performance may be detected by monitoring photoemission efficiency. When degradation becomes apparent, replenishment of photoemissive coating 32 may begin.

For photocathode device 100, the element from which ion spray 105 is generated is part of cartridge 108. In practice, cartridge 108 may be a small, hollow stainless steel vial filled with a suitable material, such as elemental cesium, sodium, potassium, etc. Cartridge 108 may be attached to rod 102 with a press-fit. The tip of cartridge 108 may provide an exit orifice for the replenishment material inside cartridge 108. In practice, the orifice may have a small diameter (e.g., 0.25 millimeters).

Cartridge 108 may be filled with replenishment material under a pure argon atmosphere, and then may be press-fit onto rod 102. When assembled and under a vacuum, ion emission begins with a suitable electrical potential (i.e., voltage) is applied that strikes a plasma at the tip of cartridge 108. The relatively mild heating of the plasma keeps ions 105 flowing and piezo motor 56 is adjusted longitudinally for a given voltage to achieve a desired gradient for stable operation. In practice, stable operation is something that may be adjusted on the fly, rather than just using initial voltage settings.

The field gradient should be sufficient to ionize the replenishment material and accelerate the ions from cartridge 108 toward metallic grid 114. Metallic grid 114 is substantially transparent to most of ions 105, and they continue on and are deposited on inner surface 16 of porous cathode substrate 12. Ions 105 neutralize at inner surface 16 because porous cathode substrate 12 is metallic and releases electrons to ions 105, and because photocathode device 100 is operating at ground potential so that there are enough electrons to continually neutralize the ions 105 that deposit the porous cathode substrate 12. The resulting neutral atoms effuse through porous cathode substrate 12 due to a concentration gradient that develops across porous cathode substrate 12 (i.e., the replenishment material moves from inner surface 16 to outer surface 14 in order to minimize this concentration gradient).

Piezo linear motor 56, otherwise referred to herein as a piezo crystal or a piezo-driven actuator, may be hollowed out all the way down its length. This allows rod 102 and attached cartridge 108 to be inserted, removed, and replaced. This may be accomplished by mounting cartridge 108 on a toothpick-style stainless steel rod that inserts conveniently into the hollow bore of piezo linear motor 56. When cartridge 108 is depleted of replenishment material, cartridge 108 and its stainless steel toothpick rod may be removed as a set and a new cartridge/rod may be inserted while in a glovebox under an inert atmosphere. Hollow piezo linear motor 56 also allows a bias potential to be applied because metallic grid 114 in front of it, as well as the entire assembly, is at ground potential, but rod 108, to which the cesium cartridge 108 is mounted, is connected to a high voltage. Hollow insulating sleeve 110 may be made from an insulating ceramic material (e.g., a glass ceramic such as MACOR®). Because it is made from an insulating material, insulating sleeve 110 allows application of high voltage to back end 106 of rod 102, which, in turn, conducts the high voltage to cartridge 108. This allows plasma extraction of replenishment material for the replenishment of photoemissive coating 32. Photoemissive coating 32 may be elemental cesium or a compound or alloy that includes cesium in some embodiments, including, but not limited to, $Cs_3Sb$, $CsNa_2KSb$ (in which case the diffusing element is cesium but it resides only at the surface and is not part of the bulk stoichiometry), $CsK_2Sb$, and/or $CsNaKSb$.

For photocathode device 100, a plasma discharge is created near cartridge 108. The discharge extracts ions 105 from cartridge 108 and accelerates them toward chamber 22, where they deposit onto inner surface 16 of porous cathode substrate 12. Ions 105 neutralize, and the neutral atoms eventually effuse to outer surface 14, where they replenish photoemissive coating 32. Cartridge 108 may be loaded into photocathode device 32 by inserting rod 102 into insulating sleeve 110. After vacuum system transfer and Chemical Vapor Deposition (CVD) growth processes, photocathode device 100 enters service as an electron source. As performance worsens, a high bias voltage may be applied to rod 102 that establishes a sufficiently high electric field between cartridge 108 and metallic grid 114 to initiate the plasma discharge and piezo linear actuator 56 may be adjusted back and forth to obtain the highest plasma discharge current for a given voltage potential. Actuator 56 can be continuously and precisely scanned back and forth to establish optimal plasma current. As the plasma extraction occurs, ions 105 are delivered to chamber 22, where they are converted to neutral atoms on inner surface 16 and effuse to outer surface 14 to stabilize the performance of photocathode device 100. Replenishment of photoemissive surface 32 can occur either continuously or periodically as desired.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a first chamber comprising a porous cathode substrate, the porous cathode substrate comprising an outer wall surface and an inner wall surface;
   a second chamber housing a replenishment material, the second chamber separated from the first chamber by a first wall, the first wall comprising an orifice that allows a vapor of the replenishment material to move into the first chamber from the second chamber; and
   a linear actuator system configured to convert the replenishment material into vapor or ions, wherein
   at least some of the replenishment material vapor or ions travel through the inner wall surface of the porous cathode substrate to the outer wall surface of the porous cathode substrate, thereby replenishing a photoemissive coating.

2. The apparatus of claim 1, wherein the linear actuator system comprises:
   a rod;
   a compressive element configured to urge the rod into a position where a tip of the rod is forced into the orifice;
   a first piezo-electrode and a second piezo-electrode configured to create a voltage potential therebetween; and
   a piezo linear motor configured to oscillate the rod back and forth when the voltage potential is created between the first piezo-electrode and the second piezo-electrode.

3. The apparatus of claim 2, wherein a front tip of the rod moves into and out of the orifice during oscillation, assisting in evaporation of the replenishment material and creating a pressure that causes at least some of the replenishment material vapor to flow from the second chamber to the first chamber.

4. The apparatus of claim 2, wherein a back end of the rod is operably connected to the piezo linear motor.

5. The apparatus of claim 1, further comprising:
   a third chamber comprising a compressive element, wherein
   the second chamber further comprises a movable second wall that separates the second chamber from a third chamber, and
   a compressive force is applied to the movable second wall by the compressive element.

6. The apparatus of claim 1, further comprising:
   a fill plug comprising an orifice through the second chamber that facilitates insertion of replenishment material into the second chamber.

7. The apparatus of claim 1, further comprising:
   a heating element configured to heat the replenishment material in the second chamber to further facilitate evaporation.

8. The apparatus of claim 1, wherein the linear actuator system further comprises:

a rod comprising a cartridge at an end thereof, the cartridge comprising the replenishment material and being inserted into the second chamber such that the second chamber comprises the replenishment material; and a metallic grid spanning the orifice, wherein the metallic grid provides a difference in electric potential with respect to the rod such that ions are generated from the replenishment material in the cartridge of the rod.

9. The apparatus of claim 8, wherein the linear actuator system is configured to move the rod to create a desired distance between the metallic grid and the cartridge to control a rate of ion emission.

10. The apparatus of claim 8, wherein the rod is removable from the apparatus such that it can be replaced when the replenishment material of the cartridge is depleted.

11. A photocathode device, comprising:

a first chamber comprising a porous cathode substrate, the porous cathode substrate comprising an outer wall surface and an inner wall surface;

a photoemissive coating on the outer wall surface of the porous cathode substrate;

a second chamber comprising a replenishment material, the second chamber separated from the first chamber by a first wall, the first wall comprising an orifice that allows a vapor of the replenishment material to move into the first chamber from the second chamber; and a linear actuator system configured to convert the replenishment material into vapor, the linear actuator system comprising:

a rod, a compressive element configured to urge the rod into a position where a tip of the rod is forced into the orifice, a first piezo-electrode and a second piezo-electrode configured to create a voltage potential therebetween, and a piezo linear motor configured to oscillate the rod back and forth when the voltage potential is created between the first piezo-electrode and the second piezo-electrode, wherein at least some of the replenishment material vapor travel through the inner wall surface of the porous cathode substrate to the outer wall surface of the porous cathode substrate, thereby replenishing the photoemissive coating.

12. The photocathode device of claim 11, wherein a front tip of the rod moves into and out of the orifice during oscillation, assisting in evaporation of the replenishment material and creating a pressure that causes at least some of the replenishment material vapor to flow from the second chamber to the first chamber.

13. The photocathode device of claim 11, wherein a back end of the rod is operably connected to the piezo linear motor.

14. The photocathode device of claim 11, further comprising:

a third chamber comprising a compressive element, wherein the second chamber further comprises a movable second wall that separates the second chamber from a third chamber, and a compressive force is applied to the movable second wall by the compressive element.

15. The photocathode device of claim 11, further comprising:

a fill plug comprising an orifice through the second chamber that facilitates insertion of replenishment material into the second chamber.

16. The photocathode device of claim 11, further comprising:

a heating element configured to heat the replenishment material in the second chamber to further facilitate evaporation.

17. A photocathode device, comprising:

a first chamber comprising a porous cathode substrate, the porous cathode substrate comprising an outer wall surface and an inner wall surface;

a photoemissive coating on the outer wall surface of the porous cathode substrate;

a second chamber separated from the first chamber by a first wall, the first wall comprising an orifice that allows ions of the replenishment material to move into the first chamber from the second chamber; and a linear actuator system configured to convert the replenishment material into ions, the linear actuator system comprising:

a rod comprising a cartridge at an end thereof, the cartridge comprising the replenishment material and inserted into the second chamber such that the second chamber comprises the replenishment material, and a metallic grid spanning the orifice, wherein the metallic grid provides a difference in electric potential with respect to the rod such that ions are generated from the replenishment material in the cartridge of the rod, and at least some of the replenishment material ions travel through the inner wall surface of the porous cathode substrate to the outer wall surface of the porous cathode substrate, thereby replenishing the photoemissive coating.

18. The photocathode device of claim 17, wherein the rod is removable from the apparatus such that it can be replaced when the replenishment material of the cartridge is depleted.

19. The photocathode device of claim 17, further comprising:

a third chamber comprising a compressive element, wherein the second chamber further comprises a movable second wall that separates the second chamber from a third chamber, and a compressive force is applied to the movable second wall by the compressive element.

20. The photocathode device of claim 17, wherein the linear actuator system is configured to move the rod to create a desired distance between the metallic grid and the cartridge to control a rate of ion emission.

* * * * *